United States Patent [19]

Ogawa et al.

[11] Patent Number: 5,130,162
[45] Date of Patent: Jul. 14, 1992

[54] PROCESS FOR PREPARING A PHOTO-RECORDING MEDIUM

[75] Inventors: Kazufumi Ogawa, Hirakata; Norihisa Mino, Settsu, both of Japan

[73] Assignee: Matsushita Electric Industrial Co., Ltd., Osaka, Japan

[21] Appl. No.: 650,508

[22] Filed: Feb. 5, 1991

[30] Foreign Application Priority Data

Feb. 5, 1990 [JP] Japan .................. 2-25414

[51] Int. Cl.$^5$ .................................... B05D 3/06
[52] U.S. Cl. ........................... 427/44; 427/54.1; 427/162; 427/379; 427/407.1
[58] Field of Search .............. 427/44, 54.1, 379, 162, 427/407.1; 430/945

[56] References Cited

U.S. PATENT DOCUMENTS 4,678,736 7/1987 Hanamura et al. ............ 430/945 X
4,992,300 2/1991 Ogawa et al. .................... 427/44

FOREIGN PATENT DOCUMENTS 63-49757 7/1988 Japan .
63-52135 7/1988 Japan .
2-46541 4/1990 Japan .

Primary Examiner—Michael Lusigman
Attorney, Agent, or Firm—Panitch, Schwarze, Jacobs & Nadel

[57] ABSTRACT

An optical recording medium that contains a monomolecular film or a lamination of monomolecular films having polydiacetylenic bonds is provided. The monomolecular film is prepared by adsorbing a chemical adsorbent having a diacetylene group, and a —SiCl group at one molecular end on a base plate, and irradiating said monomolecular film with ultraviolet rays to polymerize the adsorbents at the diacetylene group, thereby forming polydiacetylenic bonds. The resulting blue monomolecular film or the lamination will turn red by the application of light or heat, reversibly or irreversibly.

8 Claims, 4 Drawing Sheets

PROCESS FOR PREPARING A PHOTO-RECORDING MEDIUM

BACKGROUND OF THE INVENTION

1. Field of the Invention

The present invention relates to a process for preparing an optical recording medium. In particular, this invention relates to a process for preparing an optical recording medium with photochromic properties, which comprises a monomolecular film or a lamination of organic monomolecular films having polydiacetylenic bonds.

2. Description of the Prior Art

Diacetylene derivative polymers have conductivity and nonlinear optical effects because of the presence of a $\pi$-electron conjugated system derived from polydiacetylenic bonds. Thus, these polymers are useful as optical- and electronic functional-materials such as optical recording media. For example, as in the form of thin film such as monomolecular film.

A thin polymer film that contains polydiacetylenic bonds is prepared by irradiating radioactive rays to a thin crystalline film of a diacetylene derivative compound. However, according to this process, a single crystalline polydiacetylene thin film of large size cannot be obtained. The film is also prepared by irradiating radioactive rays to a monomolecular film formed by the Langmuir-Blodgett (LB) technique on a base plate, resulting in polymerization of the diacetylene groups.

According to this process, a polydiacetylene derivative thin film of relatively large size can be obtained. However, the film prepared by this process has poor adhesiveness to the base plate. Thus, when the optical recording medium that contains this monomolecular film is worked, the film is susceptible to peeling from the base plate. Moreover, the process will be expensive from a practical point of view because it is less efficient. Also, the resulting optical recording medium has low density, and some pinholes.

SUMMARY OF THE INVENTION

The process for preparing an optical recording medium of this invention, which overcomes the above-discussed and numerous other disadvantages and deficiencies of the prior art, comprises:

forming a monomolecular film on the surface of a base plate by adsorbing a chemical adsorbent having a diacetylene group, and a —SiCl group at one molecular end, and irradiating said monomolecular film with ultraviolet rays to polymerize said chemical addsorbent at the diacetylene group, thereby forming polydiacetylenic bonds.

In a preferred embodiment, said chemical adsorbent is represented by the following formula I:

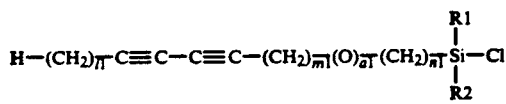

wherein R1 and R2 are each independently H, an alkyl or alkoxy group having 1 to 4 carbon atoms, or halogen; l1, m1 and n1 are each independently 0 or larger integers; the sum of l1, m1 and n1 is from 5 to 25; and a1 is 0 or 1.

In a preferred embodiment, said chemical adsorbent is any of the compounds represented by the following formulae:

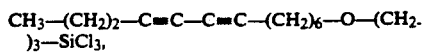

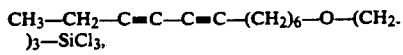

Another feature of this invention is a process for preparing an optical recording medium comprising:

forming a first monomolecular film on the surface of a base plate by adsorbing a first chemical adsorbent having a diacetylene group, a —SiCl group at one molecular end, and a —CH=CH$_2$ group at the other molecular end, irradiating said first monomolecular film with ultraviolet rays to polymerize said chemical adsorbent at the diacetylene group, thereby forming polydiacetylenic bonds, converting said —CH=CH$_2$ group into a —CH$_2$—CH$_2$OH group, forming a second monomolecular film on the surface of said polymerized first monomolecular film by adsorbing a second chemical adsorbent having a diacetylene group, and a —SiCl group at one molecular end, and irradiating said second monomolecular film with ultraviolet rays to polymerize said chemical adsorbent at the diacetylene group, thereby forming polydiacetylenic bonds.

In a preferred embodiment, at least one of said first and second chemical adsorbent has a substituent group on the carbon atom adjacent to said diacetylene group, and said substituent group can be conjugated with said polydiacetylenic bond, and said first and second chemical adsorbents are selected so that said first and second monomolecular films have different optical-absorption characteristics.

In a preferred embodiment, at least one of said first and second chemical adsorbent is represented by the following formula II:

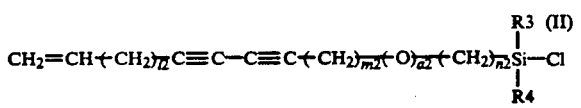

wherein R3 and R4 are each independently H, an alkyl or alkoxyl group having 1 to 4 carbon atoms, or halogen; l2, m2 and n2 are 0 or larger integers; the sum of l2, m2 and n2 is from 5 to 25; and a2 is 0 or 1.

In a preferred embodiment, at least one of said first and second chemical adsorbent is the compound represented by the following formula:

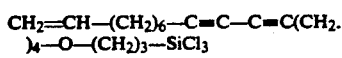

Moreover, another feature of this invention is a process for preparing an optical recording medium comprising:

forming a first monomolecular film on the surface of a base plate by adsorbing a first chemical adsorbent having a diacetylene group, a —SiCl group at one molecular end, and a —SiH group at the other molecular end, irradiating said first monomolecular film with ultraviolet rays to polymerize said chemical adsorbent at the diacetylene group, thereby forming polydiacetylenic bonds, converting said a —SiH group into —SiOH group, forming a second monomolecular film on the surface of said polymerized first monomolecular film by adsorbing a second chemical adsorbent having a diacetylene group, and a —SiCl group at one molecular end, and irradiating said second monomolecular film with ultraviolet rays to polymerize said chemical adsorbent at the diacetylene group, thereby forming polydiacetylenic bonds.

In a preferred embodiment, at least one of said first and second chemical adsorbent has a substituent group on the carbon atom adjacent to said diacetylene group, and said substituent group can be conjugated with said polydiacetylene group, and said first and second chemical adsorbents are selected so that said first and second monomolecular films have different optical-absorption characteristics.

In a preferred embodiment, said first chemical adsorbent, or first and second chemical adsorbents are represented by the following formula III:

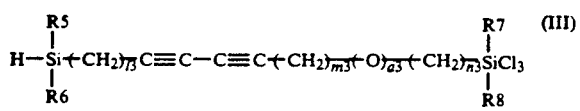

wherein R5 and R6 are each independently an alkyl group having 1 to 4 carbon atoms; R7 and R8 are each independently H, an alkyl or alkoxy group having 1 to 4 carbon atoms, or halogen; l3, m3 and n3 are 0 or larger integers; the sum of l3, m3 and n3 is from 5 to 25; and a3 is 0 or 1.

In a preferred embodiment, said first and second chemical adsorbents are the compound represented by the following formula

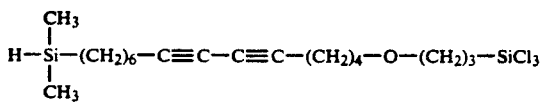

Thus, the invention described herein makes possible the objectives of:

(1) providing a process for preparing an optical recording medium which comprises the preparation of a monomolecular film or a lamination of monomolecular films having polydiacetylenic bonds formed on a base plate, the said optical recording medium having excellent adhesiveness between the base plate and monomolecular film, and optionally each monomolecular film;

(2) providing a process for preparing an optical recording medium which comprises the preparation of a monomolecular film or a lamination of monomolecular films having polydiacetylenic bonds, the said film or lamination having higher density and less pinholes than those prepared by the conventional LB technique;

(3) providing less expensive and easier process for preparing an optical recording medium that contains the above-described monomolecular film or the lamination thereof with a larger area and having better properties than the conventional LB technique;

(4) providing a process for preparing an optical recording medium which comprises the preparation of a lamination of monomolecular films having polydiacetylenic bonds, the said lamination being applicable for use in multiple optical recording media; and (5) providing a process for preparing an optical recording medium which comprises the preparation of a monomolecular film or lamination of monomolecular films, especially having polydiacetylenic bonds, the said film or lamination having a high polymerization degree when a chemical adsorbent having oxygen in its principal chain is used.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENT

A chemical adsorbent used in the process for preparing a monomolecular film provided for optical recording media of this invention, having a diacetylene group (—C≡C—C≡C—) and —SiCl group at one molecular end. The chemical adsorbent, is for example, represented by the following formula I:

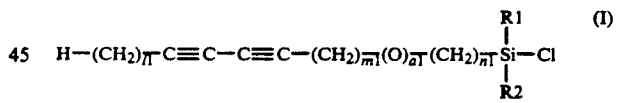

wherein R1 and R2 are each independently H, an alkyl or alkoxy group having 1 to 4 carbon atoms, or halogen; l1, m1 and n1 are each independently 0 or larger integers; the sum of l1, m1 and n1 is from 5 to 25; and a1 is 0 or 1.

Examples of the chemical adsorbent represented by the above-described formula I are illustrated below:

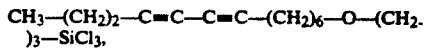

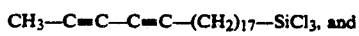

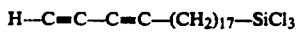

When a lamination of monomolecular films is formed, a chemical adsorbent represented by the following formula II or III can preferably be used:

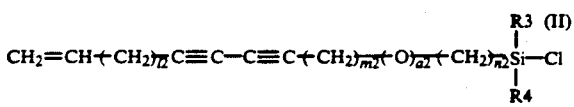

wherein R3 and R4 are each independently H, an alkyl or alkoxyl group having 1 to 4 carbon atoms, or halogen; l2, m2 and n2 are each independently 0 or larger integers; the sum of l2, m2 and n2 is from 5 to 25; and a2 is 0 or 1. or

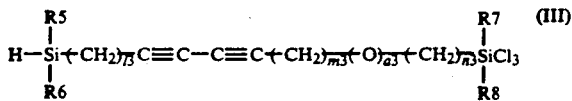

wherein R5 and R6 are each independently an alkyl group having 1 to 4 carbon atoms; R7 and R8 are each independently H, an alkyl or alkoxy group having 1 to 4 carbon atoms, or halogen; l3, m3 and n3 are each independently 0 or larger integers; the sum of l3, m3 and n3 is from 5 to 25; and a3 is 0 or 1.

Examples of the chemical adsorbents represented by the above-described formulas II and III are illustrated below:

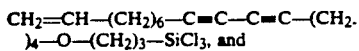

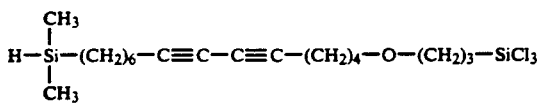

Figure 1A:
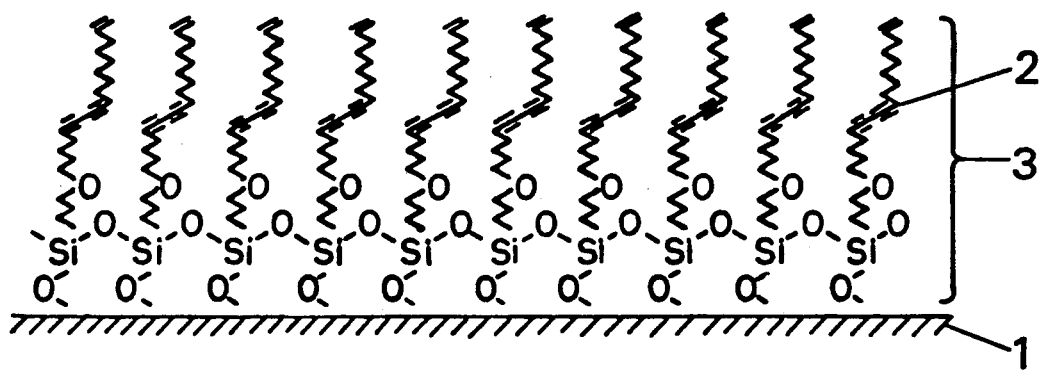
FIGS. 1a-1d shows a process for preparing a lamination of monomolecular films used for optical recording media of this invention.

In the process for preparing a monomolecular film for use in an optical recording medium of this invention, a base plate having a functional group such as hydroxyl group, amino group, carboxyl group, and the like on its surface (i.e., a base plate having a hydrophilic surface) is first provided. For example, a silicon base plate having an oxidation film formed on its surface is preferably used. The oxidation film is formed by the treatment of the base plate with a thermal oxidation, or formed by natural oxidation. Next, the base plate is immersed in a solution of a chemical adsorbent in a non-aqueous organic solvent. The organic solvent which can be used includes n-hexane, carbon tetrachloride, and the like, and mixtures thereof. The concentration of the chemical adsorbent may be varied depending on the kinds of the base plate and its surface area, and is usually from $2.0 \times 10^{-3}$ to $5.0 \times 10^{-3}$ mol/L. By this immersion procedure, the —Si—Cl group that is present in the chemical adsorbent reacts with a —OH group that is present on the base plate, so that the chemical adsorbent can be bound chemically to the surface of the base plate. When the chemical adsorbent having —SiCl$_3$ is used, the monomolecular film shown in FIG. 1a is formed by the immersion procedure described above.

Figure 1B:
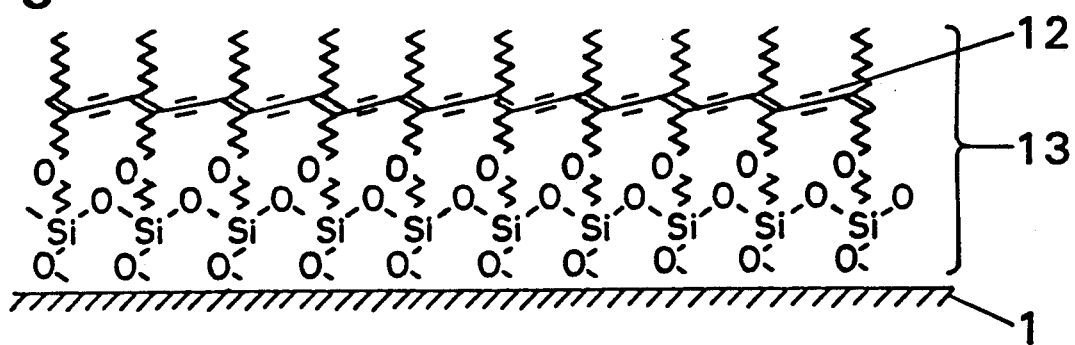

Next, the monomolecular film 3 formed on the base plate 1 is irradiated with ultraviolet rays to polymerize the adsorbent at the diacetylene group 2, thereby forming a polydiacetylenic bond 12 as shown in FIG. 1b. The polydiacetylenic bond can also be formed by irradiating with X-rays, electron beams, or gamma rays instead of ultraviolet rays, all of which have higher energy than ultraviolet rays.

Figure 1C:
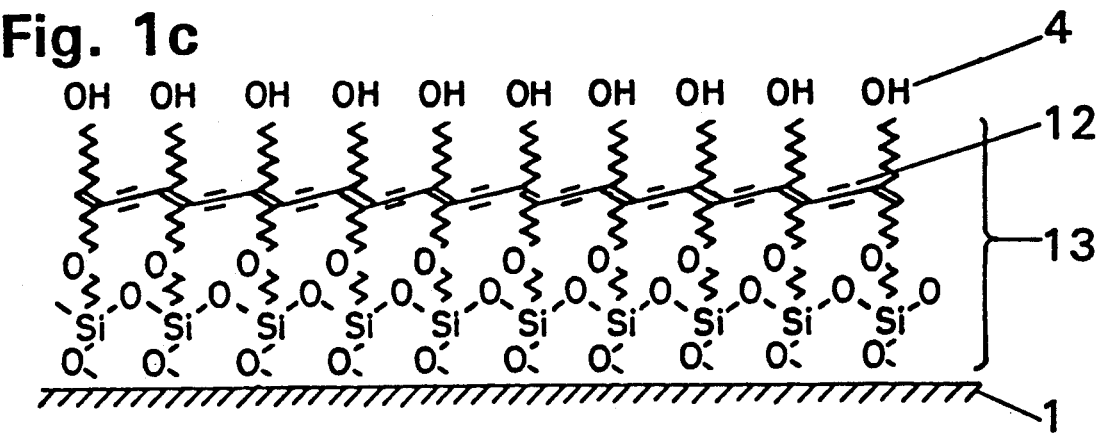
Figure 1D:
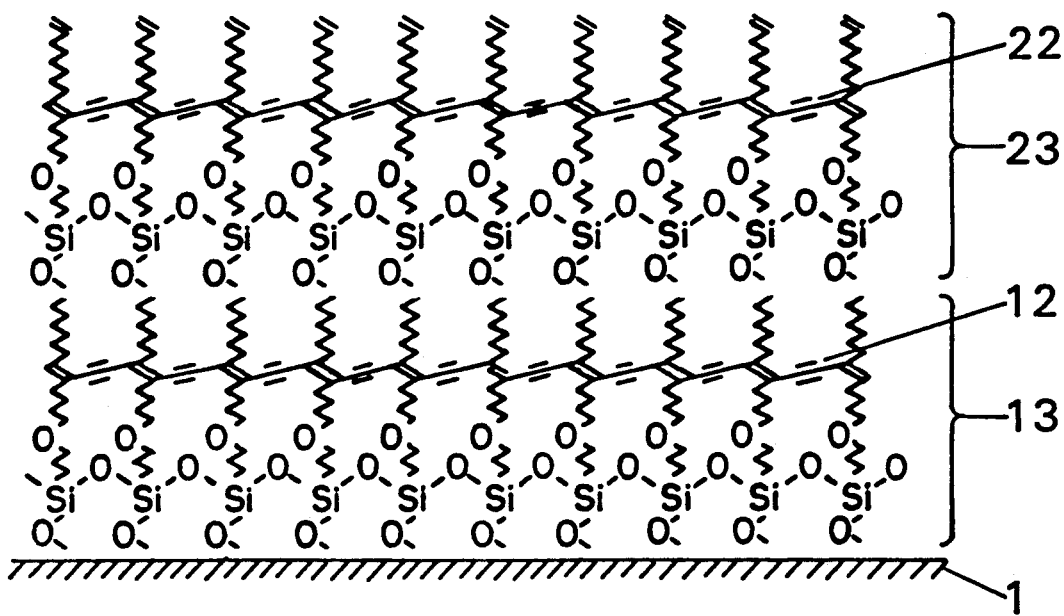

For preparing a lamination of monomolecular films, a chemical adsorbent represented by the formula II or III is preferably used. For example, first monomolecular film 3 is formed on the base plate 1 as described in FIG. 1a by adsorbing the first chemical adsorbent of formula II. The first monomolecular film 3 is irradiated with ultraviolet rays to polymerize the chemical adsorbent at the diacetylene group 2, thereby forming a polydiacetylenic bonds 12 (FIG. 1b). Then, the polymerized first monomolecular film 13 is contacted with diborane THF solution followed by H$_2$O$_2$ solution that contains alkaline to convert the —CH=CH$_2$ group into a —CH$_2$—CH$_2$—OH group (FIG. 1c). The same conversion reaction is conducted by irradiating the first monomolecular film with either X-rays, electron beams, gamma rays, etc., under oxygen atmosphere. Also, in the case of irradiating the first monomolecular film with X-rays, electron beams, gamma rays, etc., under nitrogen atmosphere, the —CH=CH$_2$ group is converted into a —NH$_2$ group. Then, the base plate having the first monomolecular film is immersed into a solution of a second chemical adsorbent having a diacetylene group, and —SiCl group at one molecular end by the same procedure as described above with respect to the first chemical adsorbent. By this immersion procedure, the second monomolecular film is formed on the surface of the first monomolecular film. The second monomolecular film is also irradiated with ultraviolet rays to polymerize the chemical adsorbent at the diacetylene group, thereby forming a polydiacetylene group 22 (FIG. 1d).

When a chemical adsorbent of formula III is used, the first monomolecular film 13 after irradiation is treated with an alkaline to convert the —SiH group at the molecular end into a —SiOH group. Then, the base plate having the first monomolecular film is immersed into a solution of the second chemical adsorbent, and the second monomolecular film thus obtained is also irradiated with ultraviolet rays, thereby forming polydiacetylenic bonds.

If a chemical adsorbent represented by the formula II or III is used as the second chemical adsorbent in each process for preparing the lamination of monomolecular films described above, and then repeating the above-mentioned procedure consecutively, a lamination that can be used for optical recording media having three, four or more monomolecular film layers can be obtained. The lamination of monomolecular films can also be prepared by forming a second monomolecular film on the surface of a first monomolecular film which is not irradiated with ultraviolet rays, and then irradiating this lamination of monomolecular films with ultraviolet rays to proceed polymerization in the first and second monomolecular films, thereby forming polydiacetylenic bonds in both films.

When a chemical adsorbent having oxygen in its principal chain, i.e., a compound represented by the formula I, II or III wherein a1, a2 or a3 is 1, is used, the chemical adsorbent molecules formed on the base plate will rotate more easily. Therefore, the diacetylene group in the chemical adsorbent molecule readily reacts with the diacetylene group that is present in the neighboring molecule to form polydiacetylenic bonds. Thus a monomolecular film or a lamination of monomolecular films with high polymerization degree, and with longer conjugated systems, can be obtained. The monomolecular film or a lamination of monomolecular films having longer conjugated systems, provides optical recording media of higher quality.

When the first chemical adsorbent is different from the second one, the resulting first and second monomolecular films may have different optical-absorption characteristics. A lamination having two monomolecular films, each with different optical-absorption characteristics can be used as a multiple optical recording medium.

For preparing such a two-layered lamination, a chemical adsorbent having a substituent group on the carbon atom adjacent to the diacetylene group can be preferably be used. It is desirable that the substituent group be conjugated with the resulting polydiacetylenic bond. The substituents used, for example, include benzene ring, benzene condensed rings, amino group, amide group, carboxyl group, and the like. These substituents provide a monomolecular film having longer conjugated systems, and a higher degree of polymerization.

When a coloring matter for sensitization can be mixed with a chemical adsorbent in the process of this invention, an optical recording medium with higher recording sensitivity can be obtained. As the coloring matter for sensitization, metallocyanine-type coloring matters, and phthalocyanine-type coloring matters can preferably be used. Also, an additional optical recording medium can be prepared by using a chemical adsorbent having a group with photochromic properties, for example, spiropyran group.

According to the process of this invention described above, a monomolecular film with 10 to 50 Å thickness is formed on a base plate, and optionally, another monomolecular film is layered thereon. When, for example, the monomolecular film or the lamination is radiated with ion laser beams, it will turn from blue to red. Thus, the film or the lamination is useful for optical recording media.

EXAMPLES

The following illustrates examples of this invention in detail.

EXAMPLE 1

A semiconductive silicon base plate, the surface of which, has been oxidized by a thermal oxidation to form $SiO_2$ was provided.

A chemical adsorbent represented by the following formula was used in this example:

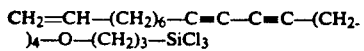

This chemical adsorbent has a diacetylene group, a —SiCl group at one molecular end, and a —CH=CH group at the other molecular end. The chemical adsorbent was dissolved into a mixed solvent containing 80 wt. % of n-hexane, 12 wt. % of carbon tetrachloride, and 8 wt. % of chloroform in a concentration of $1 \times 10^{-3}$ mol/L. The aforementioned silicon base plate was immersed into this solution. By this immersion procedure, as shown in FIG. 1a, trichlorosilyl group that was present at the end of the chemical adsorbent was bound to the —OH group on the base plate, and the elimination of hydrogen chloride occured. Thus, the chemical adsorbent was bound covalently to the base plate by a —Si—O— bond to form a first monomolecular film 3. The presence of the first monomolecular film composed of the residue of the chemical adsorbent represented by the following formula on the base plate was identified by Raman spectroscopic analysis (See, FIG. 2, Spectrum A):

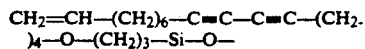

Next, the first monomolecular film 3 was irradiated with an ultraviolet ray L having a wavelength of 200–400 nm to polymerize the chemical adsorbent, thereby forming a polymerized blue monomolecular film 13 having polydiacetylenic bonds 12 (See, FIG. 1b). In order to insure that the diacetylene group was formed, the monomolecular film was irradiated with ultraviolet rays at two different radiation doses, and then its Raman scattering spectrum was observed (FIG. 2, Spectrums B and C).

Figure 2:
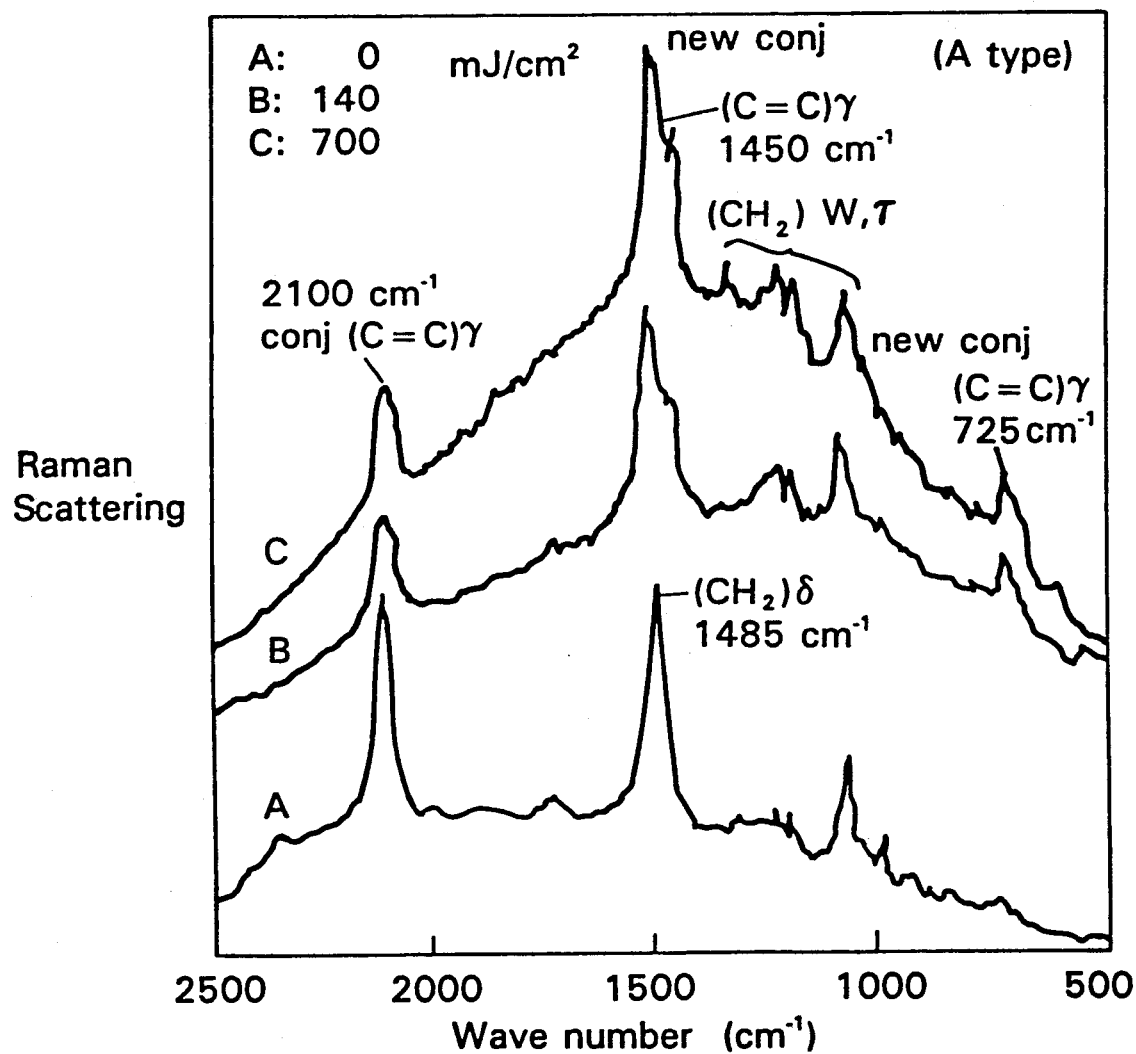
FIG. 2 shows a chart of Fourier transfer IR (FTIR) analyzed Raman spectrum of the monomolecular film irradiated with ultraviolet rays, and formed in step b as shown in FIG. 1.

As can be seen from FIG. 2, Spectrums B and C, the absorption at 2100 $cm^{-1}$ (corresponding to a conjugated triple bond) decreased, and the absorption at 1450 $cm^{-1}$ (corresponding to C=C bond) increased with the increase of the amount of ultraviolet rays, indicating that polydiacetylenic bonds, i.e., $(-C\equiv C-CH=CH-)_n$ were produced as shown in FIG. 1b.

Then, a solution of diborane in THF (1 mol/L) was prepared, and the aforementioned base plate having the first monomolecular film formed on its surface (See, FIG. 1b) was immersed into this solution at room temperature, followed by the immersion into a 30% aqueous $H_2O_2$ solution containing 0.1 mol/L of NaOH to convert the —CH=$CH_2$ groups into —$CH_2CH_2OH$ groups 4, as shown in FIG. 1c. The base plate having the first monomolecular film was then immersed into the same kind of chemical adsorbent solution by the procedure described above, in order to form a second monomolecular film on the surface of the first monomolecular film. In the above-mentioned process, the same kind of chemical adsorbents were used to form the first and second monomolecular films, but a different kind of chemical adsorbent can also be used to form the second monomolecular film. The second monomolecular film was irradiated with ultraviolet rays by the same procedure as described above, resulting in a lamination of monomolecular film with a blue color. In this example, because the chemical adsorbent having a —CH=$CH_2$ group is used to form the second monomolecular film, an additional monomolecular film can be layered on the second monomolecular film by repeating the same procedures.

Figure 3:
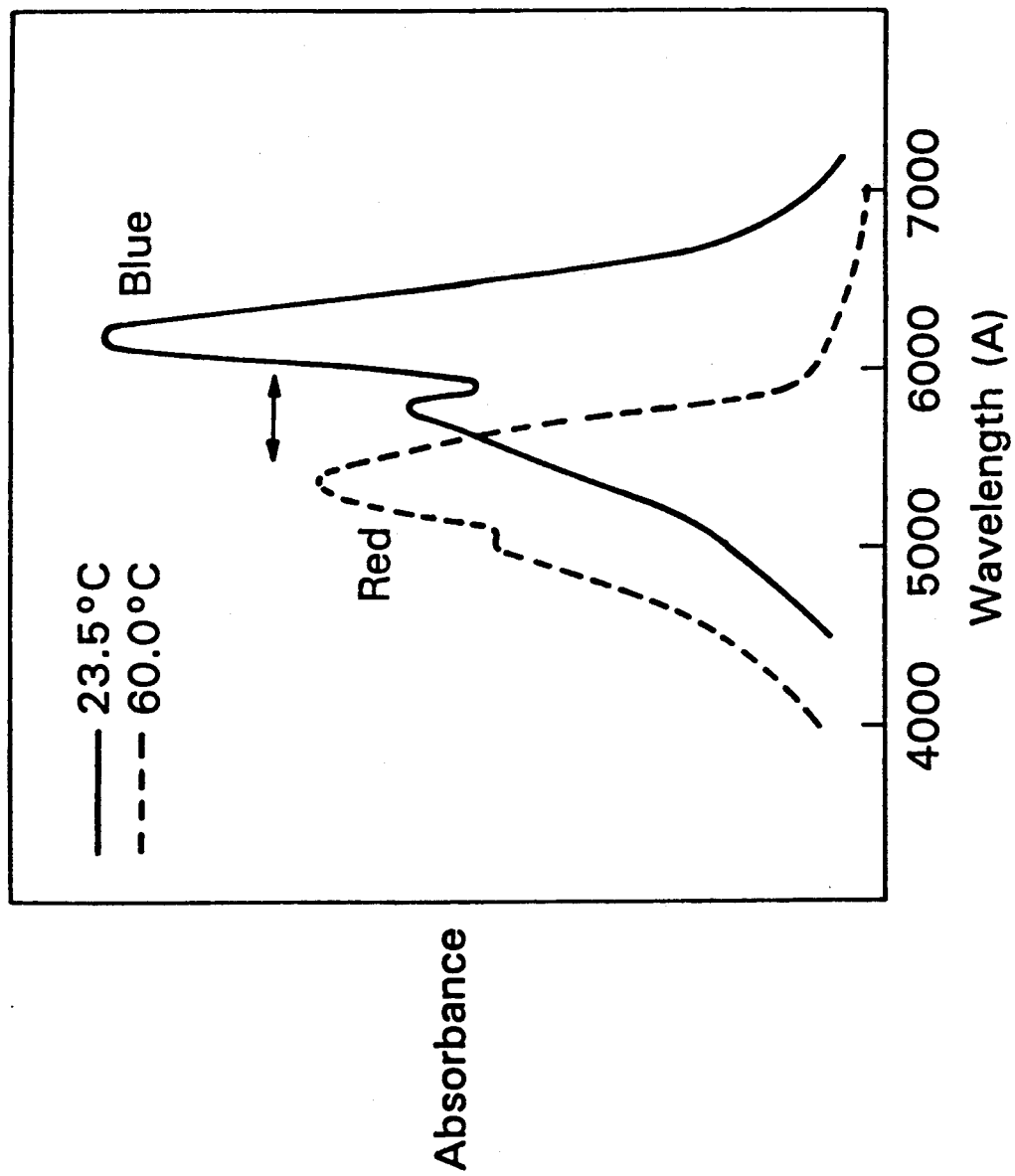
FIG. 3 shows a chart of the visible absorption spectrum of the monomolecular film prepared in Example 1 at the temperatures of 23.5° C. and 60° C.

The blue-colored lamination of monomolecular polymer films containing diacetylenic bonds as prepared above turned red when irradiated with an Ar ion laser beam, indicating that it can be used for optical recording process. The absorption spectrum of the irradiated lamination was identical to the absorption spectrum when the lamination was heated, and therefore it was confirmed that this reaction of color changes is due to the temperature increase of the monomolecular film caused by the radiation. FIG. 3 shows a chart of the absorption spectrum of the lamination observed at the temperatures of 23.5° C. and 60° C.

Also, when this photorecording process is conducted at a temperature of 70° C. or less, the red optical recording medium turned blue again by cooling (i.e., the annealing effect). Therefore, in order to perform a permanent photorecording, the optical recording medium is irradiated with for example, an Ar ion laser beam so that its temperature can increase to more than 70° C., and especially 80° C. On the other hand, as long as the optical recording medium is irradiated under the condition that the temperature of the irradiated portion is 70° C. or less, it can be used as a ereasable type medium.

The same result could be obtained by using the oxidized aluminum base plate instead of silicon base plate.

EXAMPLE 2

A lamination of monomolecular films that can be used for an optical recording medium was prepared by the same procedure as in Example 1 except that a chemical adsorbent represented by the following formula was used, and that the base plate having the polymerized first monomolecular film is immersed into a NaOH solution of $pH12$ to convert the —SiH group at the molecular end into a —SiOH group:

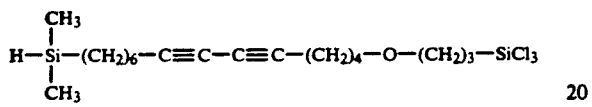

Mostly the same result as in Example 1 was obtained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for preparing an optical recording medium comprising:

forming a monomolecular film on the surface of a base plate by adsorbing a chemical adsorbent, and
   irradiating said monomolecular film with ultraviolet rays to polymerize said chemical adsorbent at the diacetylene group, thereby forming polydiacetylenic bonds,
   wherein said chemical adsorbent is represented by the following formula I:

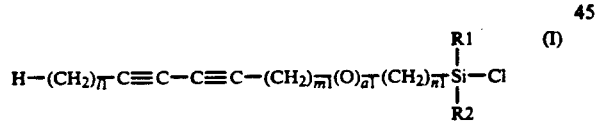

wherein R1 and R2 are each independently H, an alkyl or alkoxy group having 1 to 4 carbon atoms, or halogen; l1, m1 and n1 are each independently 0 or larger integers; the sum of l1, m1 and n1 is from 5 to 25; and a1 is 1.

2. A process of claim 1, wherein said chemical adsorbent is any of the compounds represented by the following formulae:

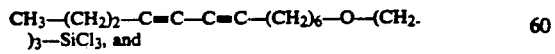
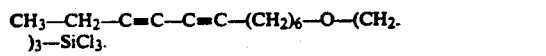

3. A process for preparing an optical recording medium comprising:

forming a first monomolecular film on the surface of a base plate by adsorbing a first chemical adsorbent having a diacetylene group, and a —SiCl group at one molecular end,
   irradiating said first monomolecular film with ultraviolet rays to polymerize said chemical adsorbent at the diacetylene group, thereby forming polydiacetylenic bonds,
   after modifying the outer functional groups of said polymerized first monomolecular film, forming a second monomolecular film on the surface of said polymerized first monomolecular film by adsorbing a second chemical adsorbent having a diacetylene group, and a —SiCl group at one molecular end, and
   irradiating said second monomolecular film with ultraviolet rays to polymerize said chemical adsorbent at the diacetylene group, thereby forming a polydiacetylenic bonds,
   wherein at least one of said first and second chemical adsorbents have a substituent group on the carbon atom adjacent to said diacetylene group, and said substituent group can be conjugated with said polydiacetylenic bond, and said first and second chemical adsorbents are selected so that said first and second monomolecular films have different optical-adsorption characteristics,
   wherein at least one of said first and second chemical adsorbent is represented by the following formula I:

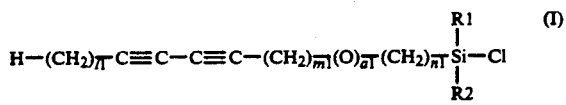

wherein R1 and R2 are each independently H, an alkyl or alkoxy group having 1 to 4 carbon atoms, or halogen; l1, m1 and n1 are each independently 0 or larger integers; the sum of l1, m1 and n1 is from 5 to 25; and a1 is 1.

4. A process of claim 3, wherein at least one of said first and second chemical adsorbent is any of the compounds represented by the following formulae:

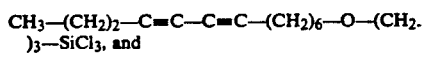

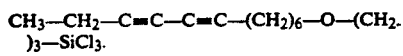

5. A process for preparing an optical recording medium comprising:

forming a first monomolecular film on the surface of a base plate by adsorbing a first chemical adsorbent having a diacetylene group, a —SiCl group at one molecular end, and a —CH=CH2 group at the other molecular end,
   irradiating said first monomolecular film with ultraviolet rays to polymerize said chemical adsorbent at the diacetylene group, thereby forming polydiacetylenic bonds,
   converting said —CH=CH2 group into a —CH2—CH2OH group,
   forming a second monomolecular film on the surface of said polymerized first monomolecular film by adsorbing a second chemical adsorbent having a diacetylene group, and a —SiCl group at one molecular end, and irradiating said second monomolecular film with ultraviolet rays to polymerize said chemical adsorbent at the diacetylene group, thereby forming polydiacetylenic bonds, wherein at least one of said first and second chemical adsorbent is represented by the following formulae II:

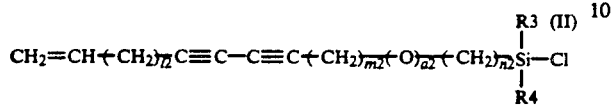

wherein R3 and R4 are each independently H, an alkyl or alkoxy group having 1 to 4 carbon atoms or haolgen; l2, m2 and n2 are each independently 0 or larger integers; the sum of l2, m2 and n2 is from 5 to 25; and a2 is 1.

6. A process of claim 5, wherein at least one of said first and second chemical adsorbent is the compound represented by the following formulae:

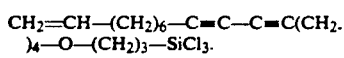

7. A process for preparing an optical recording medium comprising:

forming a first monomolecular film on the surface of a base plate by adsorbing a first chemical adsorbent having a diacetylene group, a —SiCl group at one molecular end, and a —SiH group at the other molecular end, irradiating said first monomolecular film with ultraviolet rays to polymerize said chemical adsorbent at the diacetylene group, thereby forming polydiacetylenic bonds, converting said —SiH group into a —SiOH group, forming a second monomolecular film on the surface of said polymerized first monomolecular film by adsorbing a second chemical adsorbent having a diacetylene group, and a —SiCl group at one molecular end, and irradiating said second monomolecular film with ultraviolet rays to polymerize said chemical adsorbent at the diacetylene group, thereby forming polydiacetylenic bonds, wherein said first chemical adsorbent, or first and second chemical adsorbents are represented by the following formula III:

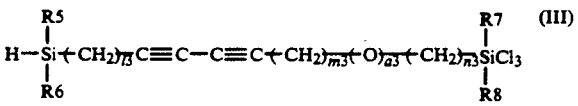

wherein R5 and R6 are each independently an alkyl group having 1 to 4 carbon atoms; R7 and R8 are each independently H, an alkyl or alkoxy group having 1 to 4 carbon atoms, or halogen; l3, m3 and n3 are each independently 0 or larger integers; the sum of l3, m3 and n3 is from 5 to 25; and a3 is 1.

8. A process of claim 7, wherein said first and second chemical adsorbents are the compound represented by the following formula:

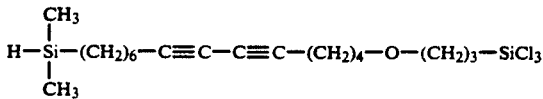

* * * * *

UNITED STATES PATENT AND TRADEMARK OFFICE
CERTIFICATE OF CORRECTION

PATENT NO. : 5,130,162
DATED : July 14, 1992
INVENTOR(S) : Kazufumi Ogawa et al.

It is certified that error appears in the above-indentified patent and that said Letters Patent is hereby corrected as shown below:

In the Drawings:

Fig. 2, "$(C=C)\gamma$", below 2100 cm$^{-1}$, should read --$(C\equiv C)\nu$--.

Fig. 2, "$(C=C)\gamma$", above 725 cm$^{-1}$, should read --$(C\equiv C)\nu$--.

Fig. 2, "$(CH_2) w, \tau$" should read --$(CH_2) \omega, \gamma$--.

Fig. 3, "Wavelength (A)" should read --Wavelength (Å).--

Column 10, line 26, change "adsorption" to --absorption--.

Column 11, lines 6 and 23, change "formulae" to --formula--.

Column 3, 5 and 12, formula III, correct right end of formula from "-SiCl$_3$" to -- -SiCl--.

Signed and Sealed this

Twenty-third Day of November, 1993

*Attest:*

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,130,162
DATED : July 14, 1992
INVENTOR(S) : Kazufumi Ogawa et al.

It is certified that error appears in the above-indentified patent and that said Letters Patent is hereby corrected as shown below:

<u>In the Drawings</u>:

Fig. 1b, add a double bond at the top of each hydrocarbon chain.

Fig. 1c, add an additional carbon and single bond at the top of each hydrocarbon chain.

Fig. 2, "(C = C)$\gamma$", above 1450 cm$^{-1}$, should read --(C = C)$\nu$--.

Fig. 2, "(C = C)$\gamma$", below 2100 cm$^{-1}$, should read --(C $\equiv$ C)$\nu$--.

Fig. 2, "(C = C)$\gamma$", above 725 cm$^{-1}$, should read --(C $\equiv$ C)$\nu$--.

Fig. 2, "(CH$_2$) W, $\tau$" should read --(CH$_2$) $\omega,\gamma$--.

Signed and Sealed this

Seventh Day of February, 1995

BRUCE LEHMAN

Attest:

*Attesting Officer*     Commissioner of Patents and Trademarks